United States Patent [19]
Huiet, Jr.

[11] 4,051,030
[45] Sept. 27, 1977

[54] LIQUIDS SEPARATING SYSTEM

[76] Inventor: George E. Huiet, Jr., 3664 Rockbridge Road, Stone Mountain, Ga. 30083

[21] Appl. No.: 687,550

[22] Filed: May 18, 1976

[51] Int. Cl.² .............................................. B01D 21/24
[52] U.S. Cl. .................................... 210/114; 137/399; 210/119
[58] Field of Search .............. 210/112, 114, 115, 119; 137/397, 398, 399, 423

[56] References Cited

U.S. PATENT DOCUMENTS

| | | | |
|---|---|---|---|
| 890,756 | 6/1908 | Brundage | 210/114 |
| 1,471,737 | 10/1923 | Jolly | 210/114 |
| 3,115,888 | 12/1963 | Moyer | 210/114 X |
| 3,685,655 | 8/1972 | Muller | 210/114 |

*Primary Examiner*—John Adee
*Attorney, Agent, or Firm*—Jones, Thomas & Askew

[57] ABSTRACT

A heavy liquid such as water in the bottom of a large tank is separated from a light liquid such as fuel which is on top of the water by the heavy liquid displacing a float actuated valve off its seat to open a drain. When the heavy liquid has drained from the tank, the float of the float actuated valve which has a specific gravity less than the heavy liquid and greater than the light liquid will sink with the level of the heavy liquid until the valve moves back to its seat to prevent the light liquid from draining out of the tank.

5 Claims, 5 Drawing Figures

U.S. Patent
Sept. 27, 1977
4,051,030
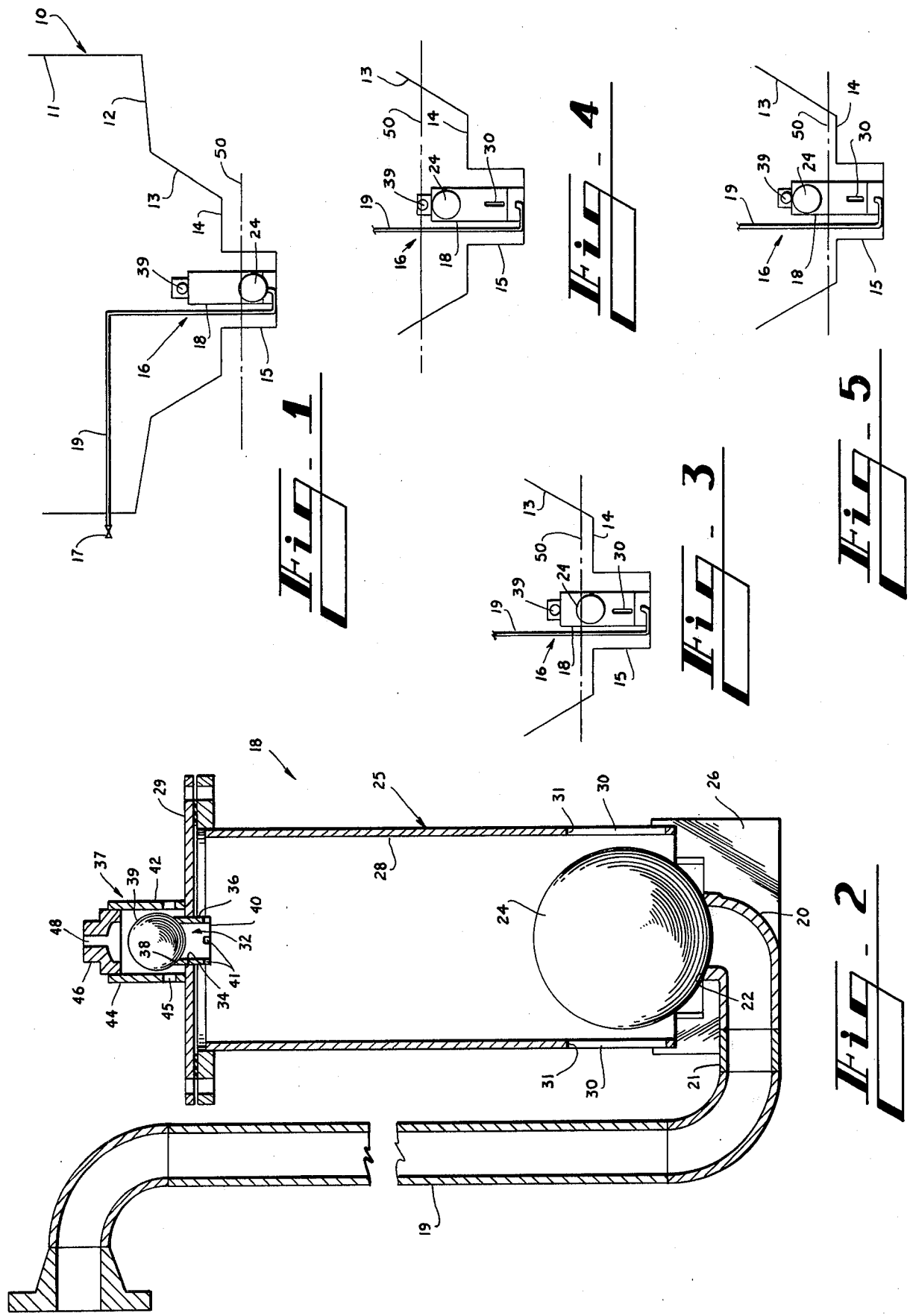

LIQUIDS SEPARATING SYSTEM

BACKGROUND OF THE INVENTION

Large supplies of fuel and other liquids are maintained in large storage tanks in various strategic locations where the fuel can be pumped into trucks and other vehicles for transportation to the consumer. The typical fuel storage tank is fabricated from metal, such as steel, and a sump is located at the bottom of the tank.

One of the problems typically encountered in fuel storage tanks is the accumulation of water inside the tank. Vapor condenses on the walls of the tank and the water drains down the walls of the tank to the surface of the fuel, and since the water is heavier than the fuel, the water settles in the bottom of the tank. As a quality control measure, the water that condenses and settles to the tank bottom must be removed before the fuel is pumped from the tank, so that the fuel being delivered to a customer is free of water. As a maintenance measure, the water must be kept out of the pipeline equipment so as to prevent rust and corrosion and mechanical failure of the equipment. Thus, the tank must be drained periodically of the water which settles in the bottom of the tank.

It is common practice to drain the water from the bottom of large fuel tanks by the use of a permanently installed drain conduit which has one of its ends in the sump of the tank and the other of its ends extending out of the tank. A valve outside the tank is manipulated to open and close the drain conduit, and an attendant periodically drains the tank of its water by opening the valve. When the attendant drains the water from the tank, the attendant must drain the water through the drain conduit until he detects the presence of fuel being drained from the tank. At this point, the attendant knows that the water is sufficiently drained from the tank; however, the water drain conduit must become filled with fuel before the attendant is able to realize that the water has been properly drained. Thus, when the attendant drains the tank again, he must first draw off all the fuel that is trapped in the drain conduit before he detects that water is being drained from the tank.

The water and fuel drained from fuel storage tanks must be kept off the ground and prevented from draining into community sewer systems, etc. and must be disposed of. Many fuel storage areas include a special drain system to dispose of the fuel and water drawn off the fuel tanks wherein the fuel-water mixture is directed to a settling area so that the fuel and water will separate and the fuel can be recaptured and the water discarded. This prior art system of draining water from fuel storage tanks causes a lot of fuel to be wasted and requires the construction and operation of an expensive fuel-water separating system.

SUMMARY OF THE INVENTION

Briefly described, the present invention comprises a liquid separating system for large fuel storage tanks and the likes wherein the heavier water at the bottom of the tank can be drained from the tank without draining the lighter fuel from the tank. A float valve having a specific gravity less than that of water and greater than that of the fuel is used to open and close the drain conduit from inside the tank. The float valve floats in the heavier water but not in the lighter fuel. As the water accumulates in the fuel storage tank, water floats the lighter float valve away from its seat so as to open the drain conduit from inside the storage tank. When the attendant subsequently opens the external valve of the drain conduit, the water will flow from the lower portion of the fuel tank through the drain conduit until the level of the water in the tank drops to a level where the float valve reengages its seat, thereupon closing the drain conduit. When the water flow through the drain conduit stops, the attendant will understand that all of the water has been drained from the fuel storage tank and he closes the external valve. Under normal circumstances no fuel will be trapped in the drain conduit or discharged from the fuel storage tank.

A valve housing is positioned over the float valve, and an upper float valve of the same specific gravity as the main float valve functions to open and close a passage through the upper portion of the valve housing to control the level of the heavy liquid in the valve housing and to control the closing of the main float valve. This provides an abrupt closing of a main float valve when substantially all of the heavier water is drained from the fuel storage tank but before any of the lighter fuel enters the drain conduit.

Thus, it is an object of this invention to provide apparatus for draining water from a large fuel storage tank without draining the fuel from the tank.

Another object of this invention is to provide apparatus for separating a heavy liquid from a lighter liquid without wasting the lighter liquid.

Another object of this invention is to provide an inexpensive, expedient and reliable system for draining fuel storage tanks and the like of water, etc.

Other objects, features and advantages of the present invention will become apparent from the following specifications, when taken in conjunction with the accompanying drawings.

BRIEF DESCRIPTION OF THE DRAWINGS

FIG. 1 is a schematic side elevational view of the lower portion of a fuel storage tank, showing the liquid separating system.

FIG. 2 is a side cross-sectional view of a portion of the liquid separating system.

FIGS. 3, 4 and 5 are schematic illustrations of the float valves and valve housing, showing the positions of the valve during the operation of the system.

DETAILED DESCRIPTION

Referring in more detail to the drawings, in which like numerals indicate like parts throughout the several views, FIG. 1 shows the lower portion of a large fuel storage tank 10 which includes an upright cylindrical wall 11, bottom wall sections 12, 13 and 14, and sump 15. The liquid separating system 16 includes a valve assembly 18 and a water drain conduit 19 with an external valve 17 located outside the storage tank. The valve assembly 18 functions as an internal valve means and the water drain conduit functions as a flow passage from the sump 15 and the bottom of the internal valve means 18 to the outside of the tank.

As is better illustrated in FIG. 2, the valve assembly 18 communicates with the internal end 20 of water drain conduit 19. The inner end of the water drain conduit 19 terminates in a pipe section 21 that has an upwardly facing internal valve seat 22. A main float valve 24 is spherical or ball-shaped and is sized to engage the valve seat 22 and to close the water drain conduit from inside the fuel storage tank 10.

Valve housing 25 is positioned about float valve 24 and includes L-shaped support plates 26 each oriented in a vertical plane at its lower portion, a cylindrical side wall 28 supported at its lower end by the support plates 26 and a cover 29 closing the upper end of the cylindrical side wall. The cylindrical side wall 25 is open at its lower end so that there is free communication to the lower end of the valve housing 25. The lower end of the cylindrical side wall 28 of the valve housing includes a plurality of slots 30 extending upwardly from the support plates 20, and the upper edge 31 of each of the slots is positioned at a level above the center of the main float valve 24 but below the uppermost point of the valve.

The portion of the valve housing above the upper edges of slot 31 is liquid-tight except for upper flow passage 32. Flow passage 32 is formed by an opening 34 in the top wall 29 of the valve housing and a pipe section 36 inserted in the opening. Pipe section 36 is oriented in a vertical attitude and includes upper valve seat 38 for engagement by upper float valve 39 and a lower end 40 which defines a series of slots 41. A valve cage 42 extends about the upper float valve 39 and comprises a pipe section 44 which includes flow ports 45 at its lower end and a plug 46 which also defines a flow port 48. The valve cage 42 functions to maintain the upper float valve 39 over its valve seat 38.

Main float valve 24 and upper float valve 39 are both fabricated so as to have a specific gravity which is less than the specific gravity of water and greater than the specific gravity of the fuel in the tank 10. For example, both float valves can be fabricated in spherical form from stainless steel with a hollow interior, and the interior can be filled with ballast of sufficient weight to regulate the exact specific gravity of the float valve. Of course, other materials can be used and the float valves can be either solid or hollow, depending upon the materials, size, etc. and formed in different shapes. The specific gravity of the float valves causes the valves to float in the heavier water but not in the lighter fuel. When the level of the water in the fuel storage tank rises so that it tends to cover the main float valve 24, the float valve will begin to float in the water and move away from its upwardly-facing valve seat 22. If the valve housing 25 is substantially filled with the lighter fuel, the heavier water will tend to displace the lighter fuel from the valve housing 25 as the level of the water rises in the tank by moving through the slots 30 in the lower end of the cylindrical side wall of the valve housing and into the valve housing, and the lighter fuel will tend to be displaced upwardly and to dislodge the upper float valve 39 from its seat 38 an amount sufficient to allow the lighter fuel to leak around the upper float valve. This condition is illustrated in FIG. 3 where the level of water is indicated at 50 and the main float valve 24 has floated off its seat.

As the level of the water continues to rise so that the main float valve 24 finally reaches the upper end of valve housing 25, the main float valve 24 will rest against the lower end 40 of the pipe section 36 and the slots 41 in the lower end of the pipe section will assure that free communication is maintained about the main float valve 24 so that substantially all of the lighter fuel can be displaced from the valve housing about the upper float valve 39 and out through the flow ports 45 and 48.

As the level of the water continues to rise in the fuel storage tank so that it begins to cover the upper float valve 37, the lighter upper float valve 39 will float in the heavier water and move away from its valve seat 38, as shown in FIG. 4.

When an attendant opens the external valve means 17 to drain the water from the fuel storage tank 10, the water in the sump 15 can flow freely through the lower end of valve housing 25 and into the water drain conduit 19 and then outside the fuel storage tank. As the level of the water in the tank recedes below the position of the upper float valve 39, the upper float valve 39 sinks in the lighter fuel so that it reengages its upper valve seat 38 and thereupon closes communication through the top wall 29 of valve housing 25. Thus, as shown in FIG. 5, a supply of the heavier water is trapped in the upper portion of valve housing 25.

As the water continues to flow about the lower end of valve housing 25 and into the water drain conduit 19, the level of water continues to recede in the fuel storage tank, but the supply of the heavier water is maintained in the upper portion of the valve housing 25. The float valve 24 will thus continue to float in the upper portion of the valve housing even though the level of the heavier water outside the valve housing recedes well below the upper position of the float valve 24.

When the level of the water in the tank finally reaches the upper edges 31 of the slots 30 in the lower end of the cylindrical side wall 28 of the valve housing 25, the ligher fuel will then be in communication with the inside of the valve housing 25 at the upper portions of the slots 30 and the heavier water can then be displaced from inside the valve housing by the lighter fuel flowing through the slots. This causes the level of the heavier water to recede abruptly in the valve housing 25 so that the float valve 24 drops rapidly in the valve housing toward its upwardly-facing valve seat 22 to abruptly close the water drain conduit. This causes the flow of water through the water drain conduit 19 to terminate and the attendant who is outside the fuel storage tank 10 will realize that the water has been properly drained from the tank and he can then close the external valve means 17.

Since a supply of the heavier water is maintained in the valve housing 25 and directly over the valve seat 22 as the water is drained from the tank, when the level of water in the storage tank becomes low enough so as to be in fairly close communication with the entrance to the water drain conduit 19, the lower level of the lighter fuel will communicate first through the slots 30 at the lower portion of the valve housing 25 and the heavier water will be allowed to flow downwardly directly toward the vicinity of the valve seat 22, assuring that only the heavier water will flow through the water drain conduit 19 and no fuel will pass through the drain conduit. Thus, the water drain conduit 19 cannot become filled with fuel during the water draining operation.

It will be understood that the foregoing relates only to a disclosed embodiment of the present invention, and that numerous changes and modifications may be made therein within the scope of the invention as defined in the following claims.

I claim:

1. Apparatus for draining heavy liquid from a tank which contains both heavy and light liquids comprising a flow passage communicating between outside the tank and inside the tank and valve means in open communication with the liquids in the tank, said valve means comprising a valve seat and a valve element arranged to engage said valve seat to open and close said flow passage, said valve element comprising a float valve with a specific gravity less than the heavy liquid and greater than the light liquid, and said valve means further including a valve housing positioned over said valve seat for confining said float valve to substantially vertical movement toward and away from said valve seat, said valve housing defining openings at its lower portion and being closed in its upper portion, an upper flow passage defined in the upper portion of said valve housing and an upper valve seat and an upper valve element arranged to engage said upper valve seat to open and close said upper flow passage, whereby when the level of the heavy liquid rises in the tank the heavier liquid displaces the lighter liquid up through the upper valve element and fills the valve housing and when the level of the heavy liquid recedes in the tank below the upper valve element the upper valve element closes and traps the heavier liquid in the valve housing and maintains the float valve high in the valve housing away from the valve seat as the heavy liquid continues to recede in the tank until the light liquid flows through the openings in the lower portion of the valve housing and displaces the heavy liquid in the valve housing and allows the float valve to move down against the valve seat.

2. The apparatus of claim 1 and wherein said flow passage includes an external valve means located outside the tank for opening and closing said flow passage independently of said internal valve means whereby the level of the heavy liquid can continue to rise in the tank after the internal valve means is open.

3. Apparatus for draining heavy liquid from a tank which contains both heavy and light liquids comprising a flow passage communicating from inside the tank to outside the tank, valve means in open communication with the liquids in the tank for opening and closing said flow passage, and valve means including means for opening said flow passage in response to the rising level of the heavier liquid in the tank above a predetermined level in the tank and for closing said flow passage in response to the receding level of the heavier liquid in the tank, and means for maintaining a supply of the heavier liquid vertically above the entrance to the flow passage and above the level of the heavier liquid in the tank as the heavier liquid flows through the flow passage and for abruptly releasing the heavier liquid to the flow passage just prior to closing the flow passage.

4. The apparatus of claim 3 and wherein said flow passage includes an external valve means located outside the tank for opening and closing said flow passage independently of said internal valve means whereby level of the heavy liquid can continue to rise in the tank after the internal valve means is open.

5. Apparatus for draining heavy liquids from a tank which contains both a heavy liquid and a light liquid comprising a drain flow passage at the lower portion of the tank, internal valve means for opening and closing said drain flow passage, an external valve means for opening and closing said drain flow passage, said internal valve means comprising a valve seat, a float valve above said valve seat movable vertically toward and away from said valve seat to close and open said drain flow passage, a valve housing positioned about said float valve and including at least one opening at a lower portion thereof at a level above said valve seat, an upper flow passage formed in said valve housing, an upper valve means for opening and closing said upper flow passage, said upper valve means comprising an upper valve seat, an upper float valve above said upper valve seat movable toward and away from the upper valve seat of said upper valve means to close and open the upper flow passage, said float valve and said upper float valve both being of a specific gravity greater than the light liquid in the tank and less than the heavy liquid in the tank, whereby when the level of the heavy liquid rises in the tank and tends to cover the float valve of the internal valve means the float valve floats in the heavy liquid off its valve seat to open the drain flow passage, and when the level of the heavy liquid rises further in the tank the heavy liquid flows through the opening in the lower portion of the valve housing and then upwardly through the valve housing to displace any light liquid in the valve housing upwardly through the upper valve means from inside the valve housing, and when the external valve means is opened to open the drain flow passage and the heavy liquid recedes to a level below the upper flow passage a supply of heavy liquid is trapped in the valve housing and maintains the float valve at a high level in the valve housing as the heavy liquid in the tank outside the valve housing continues to recede in the tank until the light liquid communicates with the lower opening in the valve housing.

* * * * *